United States Patent
Wölfel

(12) 
(10) Patent No.: US 6,474,463 B1
(45) Date of Patent: Nov. 5, 2002

(54) CONVEYING DEVICE, ESPECIALLY A SUSPENDED CONVEYING DEVICE, AND COMPONENTS BELONGING THERETO

(75) Inventor: Peter Maximilian Wölfel, Oberottmarshausen (DE)

(73) Assignee: WF Logistik GmbH, Landsberg (DE)

( * ) Notice: Subject to any disclaimer, the term of this patent is extended or adjusted under 35 U.S.C. 154(b) by 0 days.

(21) Appl. No.: 09/701,567

(22) PCT Filed: Jun. 10, 1999

(86) PCT No.: PCT/EP99/04005
§ 371 (c)(1),
(2), (4) Date: Dec. 7, 2000

(87) PCT Pub. No.: WO99/64329
PCT Pub. Date: Dec. 16, 1999

(30) Foreign Application Priority Data

Jun. 10, 1998 (DE) .......................................... 198 25 955

(51) Int. Cl.⁷ .......................... B65G 17/42; B65G 21/22
(52) U.S. Cl. .................... 198/465.4; 198/685; 198/687; 198/860.1
(58) Field of Search ................................ 198/685–687, 198/465.1–465.4, 860.1, 860.2, 861.1; 104/111

(56) References Cited

U.S. PATENT DOCUMENTS

| | | | |
|---|---|---|---|
| 3,581,877 A | | 6/1971 | Goldberg |
| 4,325,480 A | | 4/1982 | Butt |
| 4,562,921 A | * | 1/1986 | Leemkuil et al. ............ 198/841 |
| 5,404,992 A | * | 4/1995 | Robu et al. ............... 198/465.4 |
| 5,788,056 A | * | 8/1998 | Clopton ....................... 198/779 |

FOREIGN PATENT DOCUMENTS

| | | |
|---|---|---|
| DE | PS 531 970 | 8/1931 |
| DE | PS 802 752 | 2/1951 |
| DE | PS 853 910 | 10/1952 |
| DE | AS1 073 522 | 7/1958 |
| DE | AS 1 154 398 | 6/1960 |
| DE | 90 01 627 U1 | 6/1990 |
| DE | 94 06 152 U1 | 9/1994 |
| DE | 295 16 558 U1 | 1/1996 |
| DE | 197 31 846 A1 | 3/1998 |
| EP | 0398 296 B1 | 5/1990 |
| EP | 391 16 304 A1 | 11/1990 |
| EP | 0582 047 B1 | 5/1993 |
| EP | 0582 047 A1 | 5/1993 |
| EP | 0623 497 B1 | 5/1994 |
| EP | 0 623 530 | 11/1994 |
| WO | WO 95/11849 | 5/1995 |
| WO | 98 16448 | 4/1998 |

OTHER PUBLICATIONS

English–language corresponding Abstract of DE 197 31 846.
English–language corresponding Abstract of DE 391 6304.
English–language corresponding Abstract of EP 0582 047 B1.
English–language corresponding Abstract of EP 0623 497 B1.

* cited by examiner

Primary Examiner—Christopher P. Ellis
Assistant Examiner—Mark A. Deuble
(74) Attorney, Agent, or Firm—Arent Fox Kintner Plotkin & Kahn

(57) ABSTRACT

The invention relates to a conveying apparatus, in particular overhead conveying apparatus, for transporting conveyable articles along at least one conveying route (2). The conveying apparatus comprises a carrying-profile arrangement (4) which extends along the conveying route and has a running-rail arrangement (6) for guiding conveyable-article carriers (8). It is proposed that at least one running rail (6) of the running-rail arrangement be designed as a running-rail component which is separate from the carrying-profile arrangement (4) and is mounted in a floating manner on the carrying-profile arrangement such that, at least in certain areas, it can compensate for a change in length by moving relative to the carrying-profile arrangement.

19 Claims, 6 Drawing Sheets

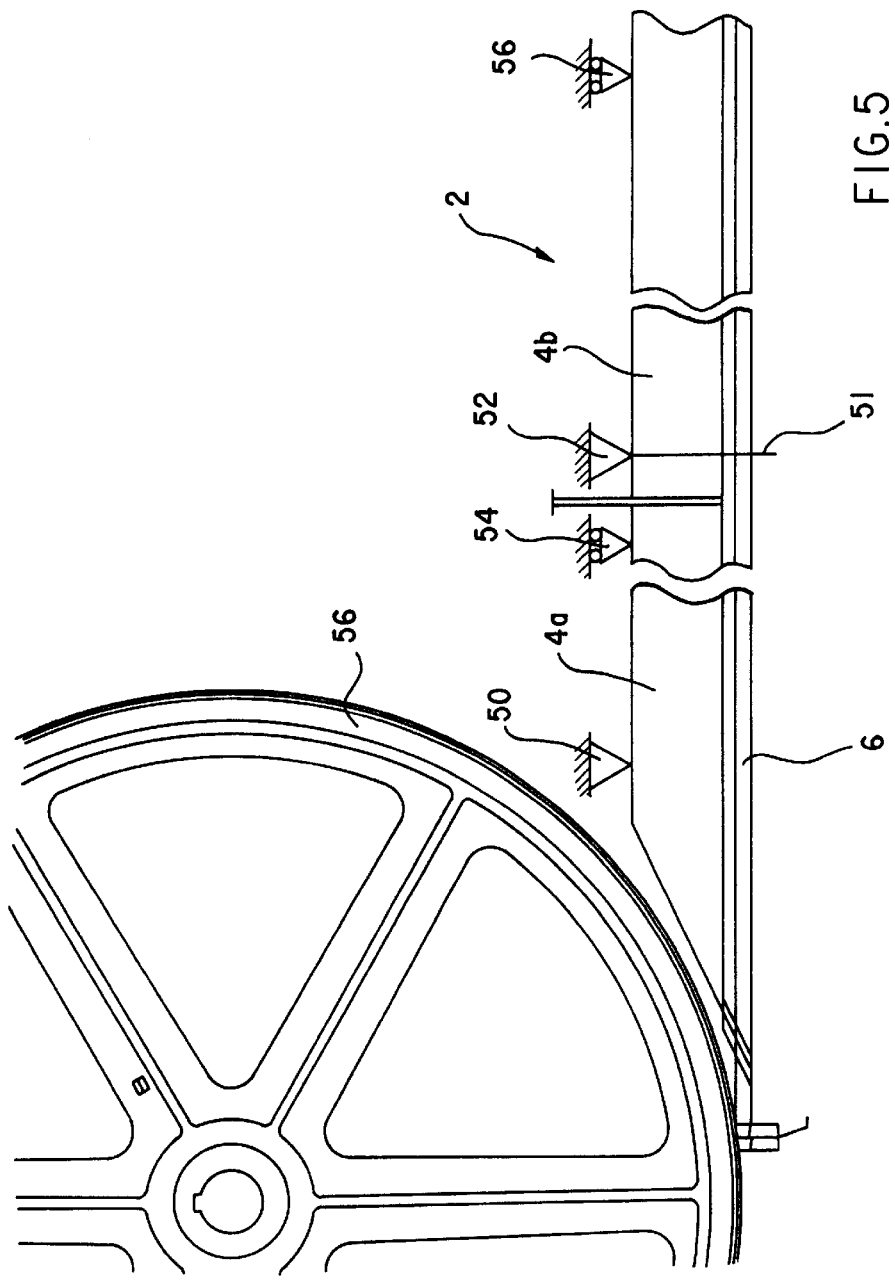

CONVEYING DEVICE, ESPECIALLY A SUSPENDED CONVEYING DEVICE, AND COMPONENTS BELONGING THERETO

The present invention relates to a conveying apparatus, in particular overhead conveying apparatus, for transporting conveyable articles along at least one conveying route, comprising a carrying-profile arrangement which extends along the conveying route and has a running-rail arrangement for guiding conveyable-article carriers.

Such a conveying apparatus is known, for example, from EP 0 582 047 A1 and EP 0 623 497 B1. A further such conveying apparatus and a set of assembly profiles for assembling a rail system of the overhead conveying apparatus is known from EP 0 623 530 A1. FIG. 1 of EP 0 623 530 A1 shows a typical carrying profile with an integral running rail and integral guide for a frictional-belt drive. The carrying profile is an extruded aluminum profile. Said carrying-profile component makes it possible, in particular in conjunction with the rest of the system components shown in EP 0 623 530 A1, to construct high-performance conveying apparatuses. In contrast to the exemplary embodiments explained in EP 0 623 530 A1, it is also considered, at the end of the Offenlegungsschrift, to fasten a separate rail on a carrying profile (carrier profile) rather than forming it integrally therewith. No more detail is said in this respect, and it is unclear as to whether the rail is intended to be a rail having a running surface, that is to say a running rail, which, in the exemplary embodiment of FIG. 1, is formed in a single piece with the carrying profile. If it is concluded that such a running rail is intended, then it is arguable what is to be achieved by the carrying profile and the running rail being designed as separate components, since, as will be immediately obvious to the person skilled in the art, the assembly outlay is increased to a considerable extent as a result.

However, it has now unexpectedly been found that the increased assembly outlay involved in separate running rails can be accepted as being less important, in relation to the advantages which can be achieved by separate running rails, if it is ensured that the respective running rail is mounted on a running-rail arrangement such that, at least in certain areas, compensation for a change in length is made possible. For the conveying apparatus mentioned in the introduction, it is proposed according to the invention, for this purpose, that at least one running rail of the running-rail arrangement be designed as a running-rail component which is separate from the carrying-profile arrangement and is mounted in a floating manner on the carrying-profile arrangement such that, at least in certain areas, it can compensate for a change in length by moving relative to the carrying-profile arrangement.

This is because it has been found that, at least under special use conditions for the conveying apparatus, for example in laundries having an ambient temperature of from 30° to 40°, temperature-induced fluctuations in length of the profiles cause problems which can only be controlled with high outlay by carrying profiles with integral running rails, whereas fluctuations in length can be controlled considerably more easily by a conveying apparatus according to the invention, with the result that, overall, more straight forward handling and even, surprisingly, a higher capacity for loading by transporting loads are achieved. According to the invention, the carryingprofile arrangement may be assembled such that carrying profiles of the carrying-profile arrangement are assembled with a gap or with an expansion joint between successive carrying profiles, with the result that it is readily possible to accommodate the expected changes in length of the carrying profiles. With a carrying profile comprising an integrated running rail, this would be possible, at most, to a limited extent since gaps or expansion joints between adjacent carrying profiles, and thus between adjacent running-rail portions, render the satisfactory guidance of conveyable-article carriers difficult. This is because, if no additional steps are taken, the conveyablearticle carriers could get caught at the gaps or expansion joints, with the result that a proper continuous conveying operation is not ensured.

According to the invention, in contrast, the separate running rail can bridge expansion joints or gaps between adjacent carrying profiles of the carrying-profile arrangement, with the result that the conveyable-article carriers are also guided properly in the region of the expansion joints or gaps.

According to the invention, relative changes in length between the carrying-profile arrangement, on the one hand, and running rail, on the other hand, are controlled by the "floating mounting", which, at least in certain areas, makes it possible to compensate for a change in length by moving relative to the carryingprofile arrangement. This prevents the situation where, during changes in temperature, the running rail and/or the carrying-profile-arrangement portion which bears the running rail are subject to a build-up of stressing, which, in particular in conjunction with high conveying loads, could result in a higher level of wear or in the service life of the relevant components being shortened. A higher loading capacity of the respective conveying route is thus ensured at least indirectly.

In order to accommodate, on the one hand, absolute changes in length of the at least one running rail and, on the other hand, relative changes in length between the running rail and the running-rail arrangement portion which bears the running rail, it is proposed that the running-rail component, which is mounted on the carrying-profile arrangement, has at least one free end which can be moved relative to the carrying-profile arrangement in order to compensate for in particular temperature-induced-fluctuations in length of the running-rail component and/or of the at least one carrying profile of the carrying-profile arrangement. Accommodating relative changes in length between a running-rail component, on the one hand, and carrying-profile arrangement, on the other hand, is important, in particular, when the carrying profiles of the carrying-profile arrangement and the running-rail components are produced from different materials and the two materials differ in terms of their coefficient of thermal expansion.

In this context, it is proposed as particularly preferable that the free end be arranged in the region of a corner-turning deflecting drum for the conveyablearticle carriers or of a transfer arrangement for transferring the conveyable-article carries from a first conveying route to a second conveying route. The arrangement may then be designed such that the conveyable-article carriers no longer run over the free end, or that, as they run over the free end, the conveyable-article carriers are additionally guided by further guide means, with the result that (relative) fluctuations in length manifested as changes or displacements in position of the free end along the carrying-profile arrangement are not problematic as far as the guidance of the conveyable-article carriers is concerned.

To be on the safe side, however, it is possible to provide, in the region of the free end or at some other location of the running-rail component, that the running-rail component has at least one first engagement portion, which is in, or can be brought into, form-fitting engagement with an associated first mating engagement portion of the carrying-profile arrangement, the first engagement portion and the first mating engagement portion being provided in order to limit an—in particular temperature-induced—relative movement between the running-rail component and carrying-profile arrangement. This measure ensures that the running-rail component can only assume well-defined positions relative to the carrying-profile arrangement. In this context, it is also proposed that the runningrail component be, or be capable of being, secured on the carrying-profile arrangement in a locally nondisplaceable manner at precisely one fastening location. It is also ensured by this measure, which may be provided as an alternative or in addition to the position-securing means achieved by the first engagement portion and the first mating engagement portion, that the running rail is positioned on the carrying-profile arrangement in a defined manner.

In conjunction with the locally nondisplaceable securing means, it has been found that it is particularly advantageous to provide the fastening location in the region of a fixed bearing for the carrying-profile arrangement and/or in the region of a joint between adjacent running-rail components. If the fastening location is provided in the region of a fixed bearing for the carrying-profile arrangement, then that movement of running-rail portions relative to the carrying-profile arrangement which may be necessary for compensating for a change in length is kept as small as possible. If the fastening location is provided in the region of a joint between adjacent running-rail components, then it is readily possible to ensure that two running-rail components following one after the other along the conveying route always adjoin one another in a flush manner, without a gap being produced or the two running-rail components pressing against one another to an excessive extent at the joint, with the result that damaging stressing could build up in the conveying route.

In order for the running-rail component to be fastened securely on the carrying-profile arrangement in a manner which allows the abovedescribed "floating" mounting, it is proposed that the running-rail component has at least one second engagement portion, which is in, or can be brought into, form-fitting engagement with an associated second mating engagement portion of the carrying-profile arrangement. The second engagement portion and the second mating engagement portion preferably make it possible for the runningrail component to be fitted into the carrying-profile arrangement. It is possible here for the fitted-in running-rail component to be, or to be capable of being, secured against disengagement by means of a bottom-engagement element which engages beneath an associated portion of the carrying-profile arrangement.

The running rail and the fastening thereof on the running-rail arrangement will usually be designed such that the running rail can be exchanged comparatively easily, for example in order for the conveying apparatus to be converted for other conveyable-article carriers. In this context, it is proposed as particularly preferred that the runningrail component has an integrated guide for a drive belt, in particular frictional belt, which is guided along the running rail and serves for carrying along conveyable-article carriers. As an alternative solution, it is proposed that the running-rail component has an integrated fastening arrangement for fastening a separate guide for a drive belt, in particular frictional belt, which is guided along the running rail and serves for carrying along conveyable-article carriers. Both proposals achieve the situation where the drive belt can also be readily be exchanged, for example by a drive belt which is designed for carrying along the new conveyable-article carriers. This means that the conveying apparatus according to the invention has a particularly secure future since it can easily be adapted to new conveying tasks and further developments in conveyable-article carriers.

According to another aspect of the invention, it is proposed, for the conveying apparatus mentioned in the introduction or for the conveying apparatus according to the invention, that, at least in certain areas along the conveying route, the carrying-profile arrangement has a securing arrangement for securing the conveyable-article carriers against tilting out of a carry-along position relative to the running-rail arrangement and/or for securing the conveyable-article carriers against falling off the running-rail arrangement, the securing arrangement comprising at least one securing-profile component which is separate from the carrying-profile arrangement and the runningrail arrangement and is fastened releasably, in particular if mounted in a floating manner, on the carrying-profile arrangement. According to this proposal, on the one hand, straight forward adaptation of the securing arrangement in terms of other conveyable-article carriers is made possible. On the other hand, the proposed floating mounting achieves the situation where—as in the case of the running-rail component according to the invention—temperature induced changes in length of the securing-profile component or of the carrying-profile portion which bears the securing-profile component do not pose any problems and, in particular, the securing arrangement can manage without expansion joints or gaps, at which conveyable-article carriers could get caught, between successive securing elements. The preferred features of the running-rail component according to the invention which have been explained above may also be provided correspondingly in the case of the securing-profile component according to the invention; there is no need for the features and the advantages thereby achieved to be explained again.

As far as the fastening of the securing-profile component on the carrying-profile arrangement is concerned, however, it is proposed as particularly preferred that the securing-profile component be, or be capable of being, latched to the carrying-profile arrangement, if appropriate snap-fitted therein or thereon.

According to another aspect of the invention, it is proposed that provided as drive belt of the conveying apparatus be a drive chain which can be driven with a form fit and bears at least one frictional element for carrying along conveyable-article carriers along the conveying route with a friction fit. Such a drive belt is advantageous in so far, firstly, it is possible for the drive belt to be driven with a form fit, by means of a which slippage is avoided and temperature-induced changes in length of the drive belt can be easily controlled. On account of the at least one frictional element, which is borne by the drive chain and is carried along by the same, the conveyable-article carriers may be driven with a friction fit, which is advantageous in terms of allowing and/or controlling accumulation of conveyable-article carriers. The design of the drive belt as a drive chain with at least one frictional element is also of interest for conveying apparatuses with running rails which are integral with the carrying profiles.

The invention also relates to a carryingprofile component for a conveying apparatus as has been described above, it being possible, according to the invention, for an associated running-rail component and/or an associated securing-profile component to be fastened releasably, in particular mounted in a floating manner, on the carrying-profile component. If reference is made here to is, or can be, mounted in a floating manner, this is generally intended to mean that the relevant component is mounted (in a floating manner) such that, at least in certain areas, it can compensate for a change in length by moving relative to the carrying-profile arrangement. The carrying-profile component may be designed as has been explained above in relation to the carrying-profile arrangement.

The invention also relates to a running-rail component for a conveying apparatus as has been described above, which running-rail component can be fastened releasably, in particular mounted in a floating manner, on an associated carrying profile. The running-rail component may have the running-railcomponent features specified above.

The invention also relates to a securing-profile component for a conveying apparatus as has been described above, which securing-profile component can be fastened releasably, in particular mounted in a floating manner, on an associated carrying-profile component. It may have the above-explained securing-profile-component features including the running-rail-component features transferred to the securing-profile component.

The invention also relates to a set of structural elements for a conveying apparatus as has been described above. The set of structural elements according to the invention comprises at least one carrying-profile component according to the invention and at least one running-rail component according to the invention and/or at least one securing-profile component according to the invention.

The invention is explained in more detail hereinbelow with reference to exemplary embodiments shown in the figures, in which:

FIG. 5 shows a schematic view from above of a conveying route with a running-rail arrangement and a running-rail component mounted in a floating manner thereon (in contrast to the arrangement according to FIG. 1, the running-rail component from FIG. 5 projects beyond the carrying-profile arrangement in a lateral transverse direction and can thus be seen from above);

Figure 2:
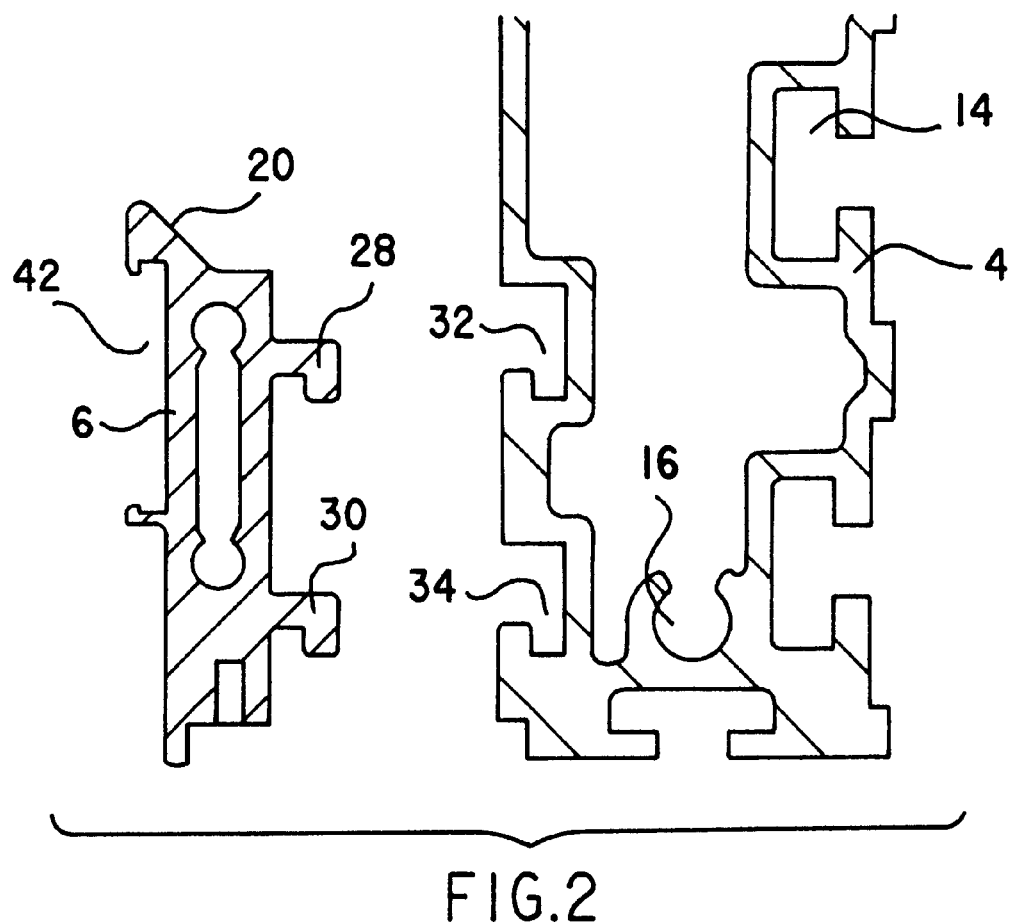
FIG. 2 shows the carrier profile and the profilelike running-rail component from FIG. 1 as separate, non-connected components.
Figure 7:
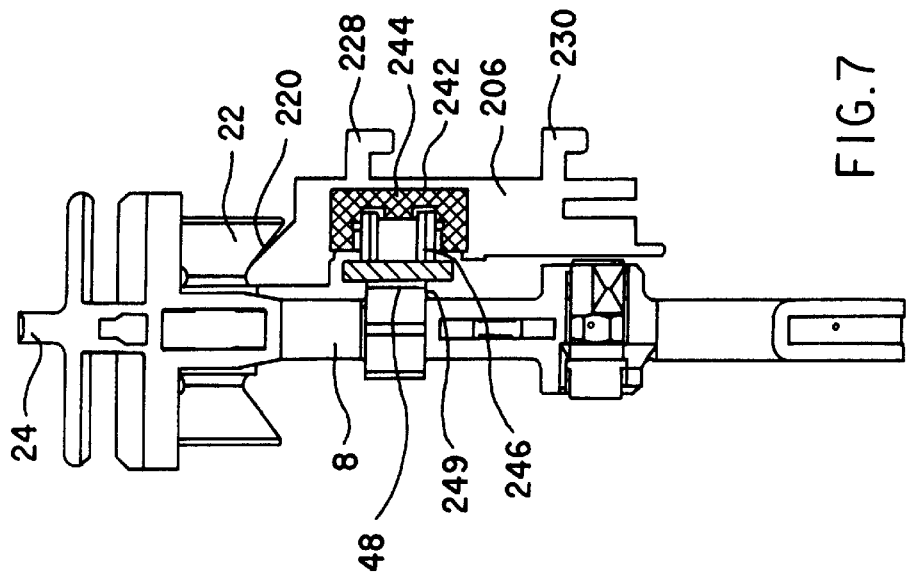
Figure 6:
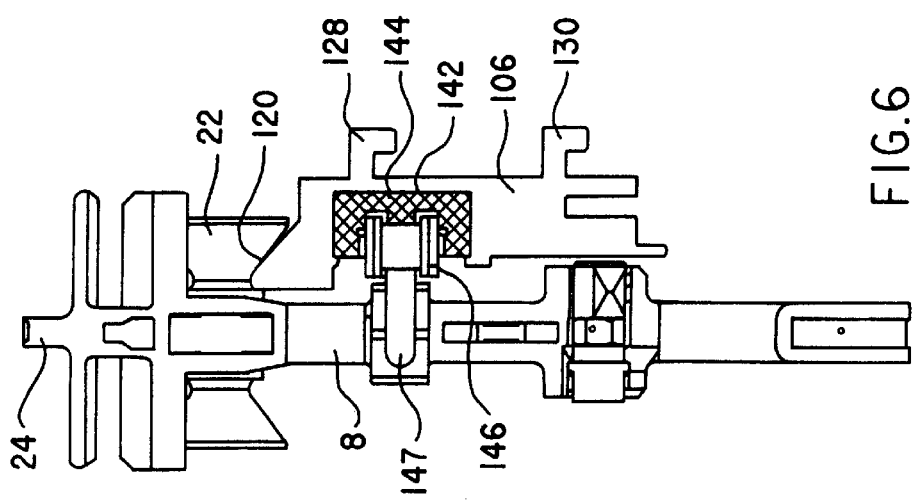

FIG. 6 shows a running-rail component which may be provided alternatively on the carrying profile and has a drive belt in the form of a drive chain; and FIG. 7 shows a further variant of a running-rail component which may be provided on the carrying profile instead of the component from FIG. 2 and which has a drive belt which is formed by a drive chain with at least one frictional element provided thereon.

Figure 1:
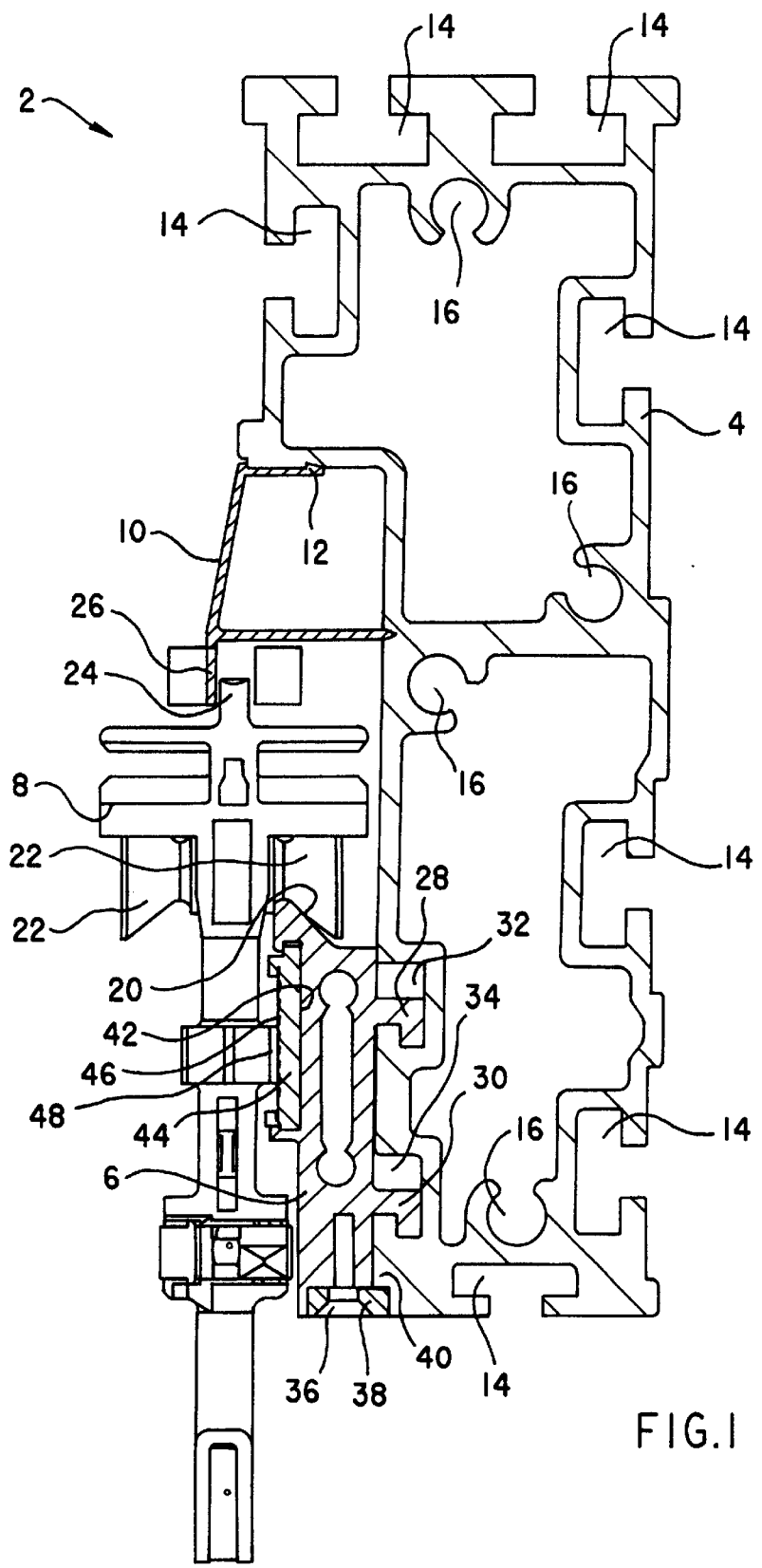
FIG. 1 shows a cross section through a carrying profile according to the invention with a separate running-rail component, which is mounted in a floating manner on the carrying profile, and with a securing-profile component snap-fitted on it, a conveyable-article carrier which runs on the running-rail component being indicated by thin lines.

FIG. 1 shows a cross section through a carrying and conveying arrangement 2 of a conveying route for transporting conveyable articles by means of conveyable-article carriers according to an exemplary embodiment of a conveying apparatus according to the invention. The carrying and conveying apparatus 2 comprises a carrying profile 4, preferably an extruded aluminum profile, on which a running rail 6, designed as a separate component, is provided in a releasable manner. Running on the running rail (preferably likewise an extruded aluminum profile) are conveyable-article carriers 8, of which one is illustrated nonsectionally by thin lines in FIG. 1. The conveyable-article carrier is secured against falling off the running rail 6 by a securing profile 10 designed as a separate component. The securing profile 10 is likewise provided releasably on the carrying profile 4, to be precise it is snap-fitted onto the carrying profile 4 or latched to the same, as is indicated at 12.

Figure 3:
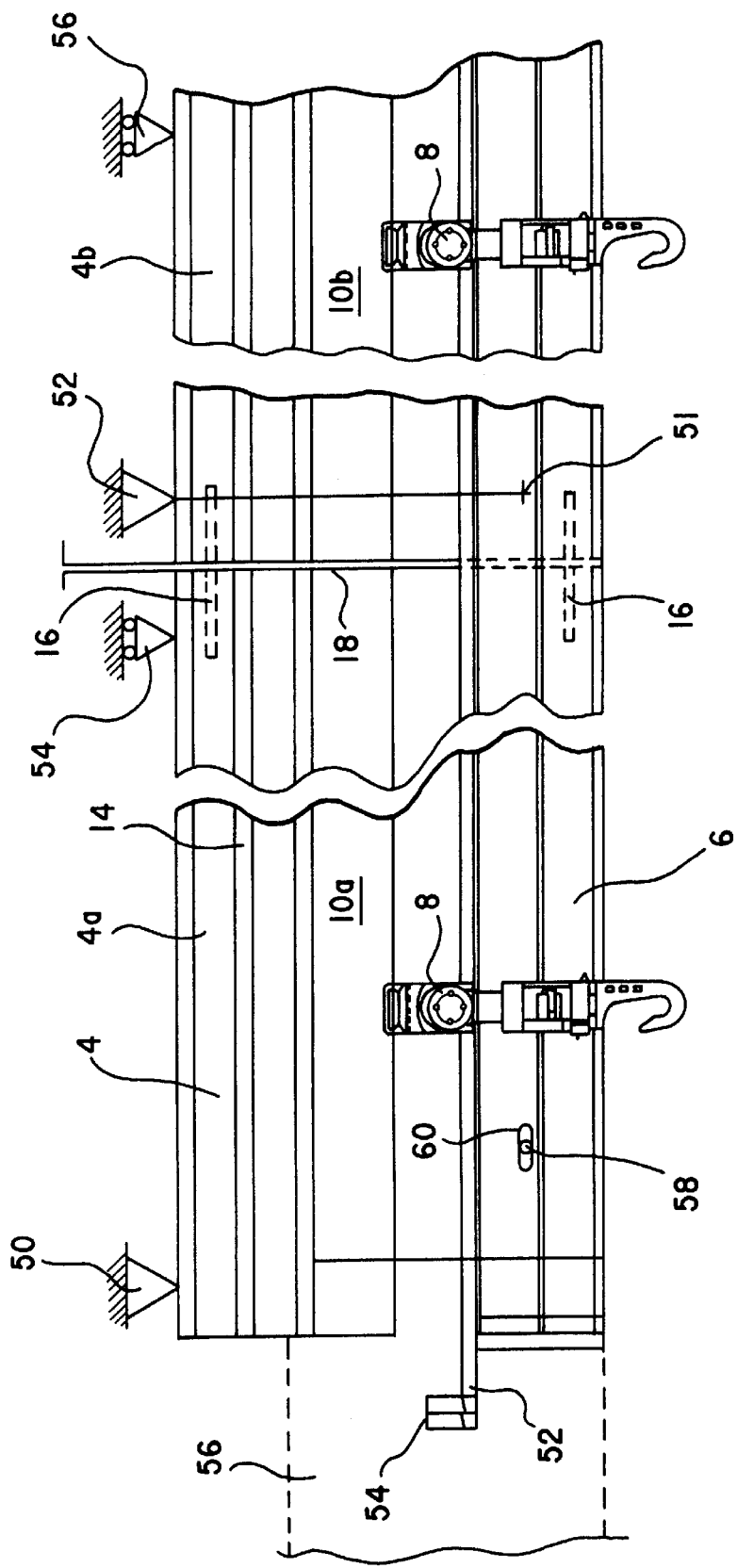
FIG. 3 shows a lateral view of a carrying-profile arrangement with a separate running-rail component mounted in a floating manner thereon and with conveyable-article carriers guided on it.

The carrying profile 4 has screw-connection recesses 14 which serve for fastening further system components. Thus, the screw-connection recesses 14 which are arranged on the other side of the carrying profile 4, in relation to the running rail 6, are intended, for example, for retaining motor supports. Furthermore, the carrying profile 4 has centering channels 16, which can accommodate centering elements, for example centering rods or the like, in order to ensure proper alignment of the carrying profiles, for example, at transition locations between carrying-profile components which follow one after the other along the conveying route. In order to be able to accommodate changes in length, which are usually temperature-induced, the successive carrying profiles may be assembled with a gap between them, with the result that something of an expansion joint is thus provided between the carrying profiles. Said expansion joint may be bridged by the centering elements (centering rods), the latter being introduced, on the one hand, into a centering channel of one carryingprofile component and, on the other hand, into a corresponding centering channel of the other carrying-profile component. You are referred in this respect to FIG. 3, which indicates two centering rods 16 which bridge an expansion joint 18 between two successive carrying profiles 4*a* and 4*b*, which have been assembled with a gap between them, and ensure that the two carrying profiles are in alignment with one another in the conveying direction. of course, it is also possible for the centering rods 16 to be designed to be considerably longer than is shown in FIG. 3. In this context, it should be mentioned that, in the exemplary embodiment shown, the running rail 6 is longer than a single carrying-profile component and bridges the expansion joint 18. It would also be possible for the securing profile to be designed to be longer than single carrying-profile components, in order to bridge expansion joints between successive carrying-profile components. In FIG. 3, however, two separate securing-profile components 10*a* and 10*b* are provided, these being assembled with an expansion joint between them which corresponds to the expansion joint 18.

The running rail 6 has an inclined running surface 20, on which one of two frustoconical running rollers 22 of the conveyable-article carrier 8 runs. Furthermore, the conveyable-article carrier has an upwardly projecting protrusion 24 which engages behind a longitudinally extending web 26 of the securing profile 10, to secure against the conveyable-article carrier falling of, as mentioned above.

The running rail 6 has cross-sectionally hook-shaped protrusions 28 and 30, which may extend over the entire length of the running rail 6 or, alternatively, may have a smaller extent, in the longitudinal direction of the running rail 6, than the length of said running rail. In the latter case, it is possible for a plurality of hook protrusions 28 and 30, which are preferably in alignment with one another in longitudinal direction, to be arranged one behind the other along the running rail. According to FIG. 1, the running rail 6 is fitted into the carrying profile 4, to be precise by means of the hook protrusion 28, 30, which engage in corresponding lateral hook-in recesses 32 and 34 of the carrying profile 4. In FIG. 2, the carrying profile 4 and the running rail 6 are shown in the non-hooked-in state.

It is possible to provide securing means which secure the running rail 6 against disengagement from the carrying profile. The securing element shown in FIG. 1 is a bottom-engagement element 38 which is fastened on the running rail 6 by means of a screw 36, engages beneath a portion 40 of the carrying profile and thus prevents the running rail 6 from being disengaged.

The running rail 6 has an accommodating recess 42 for a drive-belt guide (in this case frictional-belt guide) 44 which is separate from the running rail 6, the top and bottom boundaries of the accommodating recess 42 being designed such that the associated frictional-belt guide 44 can be snap-fitted (and according to FIG. 1 has already been snap-fitted) into the accommodating recess 42. Guided in the frictional-belt guide 44 is a frictional belt 46 which cannot be seen in detail in FIG. 1 and on which the conveyable-article carrier 8 acts with a friction fit by way of a frictional surface 48, with the result that the driven frictional belt 46 carries along the conveyable-article carrier 8 along the conveying route. Alternatively, it would also be possible for the drivebelt guide or frictional-belt guide 44 to be integral with the running rail 6.

You are referred back to FIG. 3, in which a typical assembly situation is shown. The first carrying profile 4a and the second carrying profile 4b are respectively mounted in each case on a fixed bearing 50, 52, on the one hand, and, on the other hand, on a slide bearing, roller bearing or the like which allows compensation for a change in length. On account of the fixed mounting on just one side and of the expansion joint 18 between the two carrying-profile components, it is readily possible to accommodate changes in length, which may be temperature-induced in particular, without stressing being produced in the carrying-profile arrangement.

As far as the guidance of conveyable-article carriers 8 along the conveying route is concerned, the expansion joint 18 does not pose any problems since the running rail 6 bridges the expansion joint 18. The running rail 6 is mounted "in a floating manner", by corresponding design of the hook protrusions 28 and 30 and the associated hook-in recesses 32 and 34 and of all the other elements possibly involved in the mounting and/or fastening of the running rail 6 on the carrying-profile arrangement, such that compensation for a change in length is possible between the carrying-profile arrangement 4, 4a and 4b, on the one hand, and running rail 6, on the other hand. Such floating mounting can easily be achieved in that the running rail or the running rails can be displaced along the carrying-profile arrangement. This is also the case in the situation according to FIG. 3; however, the running rail 6 is secured on the carrying profile 4b in a locally non-displaceable manner at precisely one fastening location 50. Since, however, this is the only such fastening location, compensation for a change in length is still readily possible. For this compensation for a change in length, the running rail 6 has a free end 52 which, as is indicated at 54, can be changed in position in the longitudinal direction of the running rail 6. Advantageously, according to FIG. 3, the free end of the running rail 6 is arranged in the region of a deflecting roller 56 which assumes the function of guiding the conveyablearticle carriers 8 from the running rail 6 and the securing profile 10, with the result that there is no difficulty in changing the position of the free end 52 as far as proper guidance of the conveyable-article carriers is concerned.

In order nevertheless to have conditions which are always defined, the capacity for relative movement between the running rail 6 and carrying-profile arrangement 4 is limited. For this purpose, the carrying profile 4a has a stub-like protrusion 58 which engages in a slot 60 which is located in the running rail 6 and extends in the longitudinal direction of the running rail 6. Under normal conditions, the stub-like protrusion 58 will not strike against the longitudinally spaced-apart ends of the slot 60; this will only occur in the case of special conditions, for example of unexpectedly high temperatures resulting in corresponding changes in length. The abovedescribed limitation in the capacity for relative movement between the running rail 6 and carrying-profile arrangement 4 is particularly advantageous, in particular, in so far as this makes it possible reliably to avoid the situation where the free end 52 of the running rail 6, arranged in the region of the deflecting roller 56, "runs into" the deflecting roller 56, that is to say crosses the path thereof, with the result that proper operation of the conveying apparatus is always ensured. It is recommended, during assembly of the running rail on the carrying-profile arrangement, for the stub-like protrusion 58 to be arranged approximately in the center of the slot 60, with the result that length compensation in both directions is possible. In the case where the free end of the running rail is arranged in the region of a deflecting roller (as in the exemplary embodiment of FIG. 3), it is expedient for the combination of stublike protrusion and slot to be provided in the vicinity of said free end.

Figure 4:
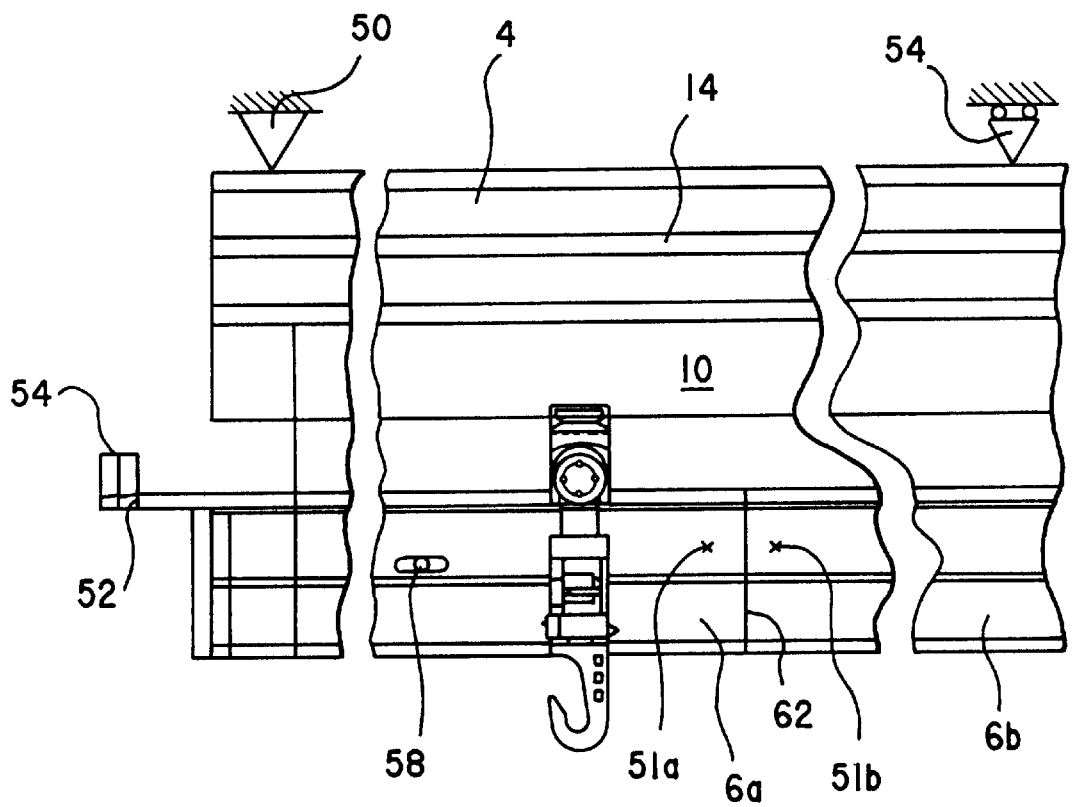
FIG. 4 shows a lateral view which corresponds to FIG. 3 and has a view of a joint between two running-rail components which follow one after the other along the conveying route.

As regards the fastening location 51, at which the running rail is secured on the carrying-profile arrangement in a locally non-displaceable manner (the fastening can take place, for example, by screw-connection), it should be added that said fastening location is preferably provided in the region of a fixed bearing. This is also the case with the situation according to FIG. 3; the fastening location 51 is provided at the same longitudinal position as the fixed bearing 52. If, however, two separate, adjoining running-rail components 6a and 6b are provided along a conveying-route portion (cf. FIG. 4), then the two running rails are preferably provided in each case in the region of a joint 62 between the adjacent, successive running-rail components 6a and 6b. The corresponding fastening locations 51a for the running rail 6a and 51b for the running rail 6b are indicated in FIG. 4. However, if it is possible, as far as the assembly situation is concerned, without excessive outlay, the joint 62 should be provided together with the fastening locations adjacent to the joint (in contrast to the assembly situation shown in FIG. 4) as far as possible in the region of a fixed bearing.

Since the fastening locations 51a and 51b of the two abutting running-rail components 6a and 6b are provided in close vicinity to the joint 62, proper connection between the two running-rail components 6a and 6b is always ensured, even in the case of changes in temperature which initiate changes in length. The changes in length of the running-rail components (absolute changes in length and relative changes in length in relation to the carrying-profile arrangement) are then accommodated in the direction of the ends opposite the joint (free end 52 of the running rail 6a) by corresponding relative displacement along the carrying-profile arrangement. This prevents the situation where either the joint 62 is widened into a gap on account of a corresponding temperature profile or the two running-rail components 6a and 6b are pressed against one another by excessive forces at the joint. Harmful stressing within the arrangement is thus avoided.

The deflecting roller 56, which is only indicated by dashed lines in FIG. 3, can be seen in detail in FIG. 5, which shows a view from above. While the carrying profiles and running rails of FIGS. 3 and 4 correspond to the carrying profile 4 and the running rail 6 from FIG. 1, the running rail 6 and carrying profiles 4a and 4b, in the carrying and conveying arrangement 2 from FIG. 5, are designed in relation to one another such that the running rail 6 can be seen from above, that is to say is not concealed in the upward direction by the carrying profiles and/or the securing profile. Otherwise, the arrangement from FIG. 5 corresponds to the arrangement from FIG. 3, and it should also be added that the bearings 50, 52, 54 and 56 are only indicated schematically in both figures and their arrangement in the figure leaves it open as to whether the carrying profiles are mounted in a downward, lateral or upward direction.

The designs shown of the carrying-profile arrangement, on the one hand, and of the running rail and/or of the running-rail arrangement, on the other hand, allow straightforward exchange of the running rails if, for example, different conveyable-article carriers are to be used. Since the drive-belt guide is arranged on the running rail or the running rails, an exchange of the drive belt which may be necessary in this context is also readily possible. This means that a conveying apparatus which is constructed from the elements described has a particularly secure future.

For example, instead of the running-rail components 6 from FIG. 2, it would be possible for the running-rail component 106 shown in FIG. 6 to be provided on the carrying-profile arrangement. The hook protrusions 128 and 130 and the running surface 120 correspond to the hook protrusions 28 and 30 and the running surface 20 of the component 6. Instead of the recess 42 for the drive-belt guide 44 for the frictional belt 46, however, the running-rail component 106 has provided in it an accommodating recess 142 for a drive-chain guide 144, in which a drive chain 146 is guided as a drive belt. The chain bears finger-like carry-along elements 147 which act with a form fit on the conveyable-article carriers 8 and carry them along in the conveying direction. In order to control and/or indeed to allow accumulation of the conveyable-article carriers, it may be possible for the carry-along fingers 147 to be swung over, for example to swing over automatically when a predetermined opposing-force threshold is exceeded.

A further example of a running-rail component which can be assembled on the carrying-profile arrangement instead of the running-rail component 6 is shown in FIG. 7. The running-rail component 206 has, like the running-rail components 6 and 106, the hook protrusions 228 and 230, which are coordinated with the hook-in recesses 32 and 34 of the carrying-profile component 4, and the running surface 220, which is coordinated with the running rollers 22 of the conveyable-article carrier 8. The accommodating recess 242 and the drive-chain guide 244 correspond to the accommodating recess 142 and the drive-chain guide 144. Instead of the drive chain 146, however, there is provided a drive chain 246 which serves likewise as a drive belt and, instead of the carry-along fingers 147, bears a continuous frictional belt 249 extending along the chain or a plurality of individual frictional elements, for example one frictional element per chain link. As in the case of FIG. 1, the conveyablearticle carrier 8 acts on the frictional belt 249, or on one of the frictional elements, by way of its frictional surface 48 and is carried along with a friction fit by the drive belt 246, 249.

The drive belt in the sense of the above nomenclature is thus to be understood as the drive chain 246 together with the frictional belt 249 fastened thereon or together with the plurality of frictional elements 249 fastened thereon.

Such a design of the drive belt 246, 249 has the great advantage that the drive belt can be driven, on the one hand, with a form fit, for example by means of corresponding gearwheels or the like engaging in the chain links, with the result that no slippage occurs here and, in particular, it is also easy to control changes in the drive-belt length which are induced by changes in temperature. Despite this form-fitting drive of the drive belt, on the other hand, the conveyablearticle carriers 8 are carried along with a friction fit, which is advantageous in terms of straightforwardly controlling and/or allowing the accumulation of conveyable-article carriers 8 along a conveying route despite the drive belt continuing to run. Merely providing just friction-fit engagement between conveyable-article carriers 8 and drive belt 46 or 246, 249 results in the relevant conveying apparatus actually being capable of accumulation since the drive belt can move along the frictional surfaces of the conveyable-article carriers when the latter are held in an accumulated arrangement. In order to reduce friction-induced wear, it is possible, in the case of an accumulation, for the friction-fit engagement between the conveyable-article carriers and the drive belt to be eliminated, for example, by means of spreading apparatuses known from EP 0 623 497 B1.

That solution for the drive belt which is proposed in FIG. 7 thus combines, at it were, the best of both worlds, that is to say the operations of the drive belt being driven with a form fit and of the conveyable-article carriers being carried along with a friction fit. This idea, which can also be used advantageously in the case of carrying profiles with an integrated running rail, also has independent importance outside the invention explained with reference to FIGS. 1 to 6 and should be afforded protection independently of said invention.

To summarize, the invention relates to a conveying apparatus, in particular overhead conveying apparatus, for transporting conveyable articles along at least one conveying route. The conveying apparatus comprises a carrying-profile arrangement which extends along the conveying route and has a running-rail arrangement for guiding conveyable-article carriers. It is proposed that at least one running rail of the running-rail arrangement be designed as a running-rail component which is separate from the carrying-profile arrangement and is mounted in a floating manner on the carrying-profile arrangement such that, at least in certain areas, it can compensate for a change in length by moving relative to the carrying-profile arrangement.

What is claimed is:

1. A conveying apparatus, in particular overhead conveying apparatus, for transporting conveyable articles along at least one conveying route (2), comprising a carrying-profile arrangement (4, 4a, 4b) which extends along the conveying route and has a running-rail arrangement (6) for guiding conveyablearticle carriers (8) at least one running rail (6) of the running-rail arrangement being designed as a running-rail component (6) which is separate from the carrying-profile arrangement (4, 4a, 4b), extends along carrying profiles (4a, 4b) of the carrying-profile arrangement and is mounted in a floating manner on said profiles such that, at least in certain areas, it can compensate for a change in length by moving relative to the carrying profiles, the running-rail component (6) bridging at least one expansion joint (18) between adjacent carrying profiles (4a, 4b) of the carrying profile arrangement.

2. The conveying apparatus as claimed in claim 1, characterized in that the running-rail component (6), which is mounted on the carrying-profile arrangement (4, 4a, 4b), has at least one free end (52) which can be moved relative to the carrying-profile arrangement in order to compensate for—in particular temperature-induced—fluctuations in length of the running-rail component (6) and/or of the at least one carrying profile (4a, 4b) of the carrying-profile arrangement.

3. The conveying apparatus as claimed in claim 2, characterized in that the free end is arranged in the region of a corner-turning deflecting drum (56) for the conveyable-article carriers (8) or of a transfer arrangement for transferring the conveyable-article carriers (8) from a first conveying route to a second conveying route.

4. The conveying apparatus as claimed in claim 1, characterized in that the running-rail component (6) has at least one first engagement portion (60), which is in form-fitting engagement with an associated first mating engagement portion (58) of one of the carrying profiles (4a, 4b) in order to limit an—in particular temperature-induced—relative movement between the running-rail component (6) and the carrying profiles (4a, 4b).

5. The conveying apparatus as claimed in claim 1, characterized in that the running-rail component (6) is secured on one of the carrying profiles (4, 4a, 4b) in a locally non-displaceable manner at precisely one fastening location (51).

6. The conveying apparatus as claimed in claim 1, characterized in that the running-rail component (6) has at least one second engagement portion (28, 30), which is in, or can be brought into, form-fitting engagement with an associated second mating engagement portion (32, 34) of the carrying-profile arrangement (4, 4a, 4b).

7. The conveying apparatus as claimed in claim 6, characterized in that the second engagement portion (28, 30) and the second mating engagement portion (32, 34) make it possible for the running-rail component (6) to be fitted into the carrying-profile arrangement (4, 4a, 4b).

8. The conveying apparatus as claimed in claim 7, characterized in that the fitted-in running-rail component (6) is, or can be, secured against disengagement by means of a bottom-engagement element (38) which engages beneath an associated portion (40) of the carrying-profile arrangement (4, 4a, 4b).

9. The conveying arrangement as claimed in claim 1, characterized in that the running-rail component has an integrated guide for a drive belt, in particular frictional belt, which is guided along the running rail and serves for carrying along conveyable-article carriers.

10. The conveying apparatus as claimed in claim 1, characterized in that the running-rail component has an integrated fastening arrangement (42) for fastening a separate guide (44) for a drive belt, in particular frictional belt (46), which is guided along the running rail (6) and serves for carrying along conveyable-article carriers (8).

11. The conveying apparatus as claimed in claim 1, characterized in that, at least in certain areas along the conveying route, the carrying-profile arrangement (4, 4a, 4b) has a securing arrangement (10, 10a, 10b) for securing the conveying-article carriers (8) against tilting out of a carry-along position relative to the running-rail arrangement (6) and/or for securing the conveyable-article carriers against falling off the running-rail arrangement (6), the securing arrangement (10, 10a, 10b) comprising at least one securing-profile component (10, 10a, 10b) which is separate from the carrying-profile arrangement (4, 4a, 4b) and the running-rail arrangement (6) and is fastened releasably, in particular is mounted in a floating manner, on the carrying-profile arrangement (4, 4a, 4b).

12. The conveying apparatus as claimed in claim 11, characterized in that the securing-profile component (10, 10a, 10b) has at least one feature of the running-rail component (6) as claimed in one of claims 1 to 8.

13. The conveying arrangement as claimed in claim 11, characterized in that the securing-profile component (10, 10a, 10b) is, or can be, latched to the carrying-profile arrangement (4, 4a, 4b).

14. The conveying apparatus as claimed in claim 1, characterized in that provided as drive belt is a drive chain (246) which can be driven with a form fit and bears at least one frictional element (249) for carrying along conveyable-article carriers (8) along the conveying route (2) with a friction fit.

15. The conveying apparatus as claimed in claim 1, characterized in the securing-profile componet (10,10a, 10b) has at least one further feature of the running-rail componet (6) as claimed in one of claims 1 to 8.

16. The conveying apparatus as claimed in claim 1, characterized in that securing-profile componet (10, 10a, 10b) is, or can be, latched to the carrying-profile arrangement (4, 4a, 4b).

17. A conveying apparatus, in particular overhead conveying apparatus, for transporting conveyable articles along at least one conveying route (2), comprising a carrying-profile arrangement (4, 4a, 4b) which extends along the conveying route and has a running-rail arrangement (6) for guiding conveyable-article carriers (8), the carrying-profile arrangement (4, 4a, 4b) having, at least in certain areas along the conveying route, a securing arrangement (10, 10a, 10b) for securing the conveying-article carriers (8) against tilting out of a carry-along position relative to the running-rail arrangement (6) and/or for securing the conveyable-article carriers against falling off the running-rail arrangement (6), the securing arrangement (10, 10a, 10b) comprising at least one securing-profile component (10, 10a, 10b) which is separate from the carrying-profile arrangement (4, 4a, 4b) and the running-rail arrangement (6), extends along carrying profiles (4a, 4b) of the carrying-profile arrangement (4, 4a, 4b) and is fastened releasably on said carrying profiles and, besides, is mounted in a floating manner such that, at least in certain areas, it can compensate for a change in length by moving relative to the carrying profiles, the securing-profile component (10) bridging at least one expansion joint (18) between adjacent carrying profiles (4a, 4b) of the carrying-profile arrangement.

18. The conveying apparatus as claimed in claim 12, characterized in that the securing-profile component (10) has at least one first engagement portion, which is in form-fitting engagement with an associated first mating engagement portion of one of the carrying profiles (4a, 4b) in order to limit an—in particular temperature-induced—relative movement between the securing-profile component (10) and the carrying profiles (4a, 4b).

19. The conveying apparatus as claimed in claim 17, characterized in that the securing-profile component (10) is secured on one of the carrying profiles (4a, 4b) in a locally non-displaceable manner at precisely one fastening location.

* * * * *